(12) United States Patent
Magoshi

(10) Patent No.: US 7,100,023 B2
(45) Date of Patent: Aug. 29, 2006

(54) SYSTEM AND METHOD FOR PROCESSING COMPLEX COMPUTER INSTRUCTIONS

(75) Inventor: Hidetaka Magoshi, Palo Alto, CA (US)

(73) Assignee: Sony Computer Entertainment Inc., (JP)

( * ) Notice: Subject to any disclaimer, the term of this patent is extended or adjusted under 35 U.S.C. 154(b) by 590 days.

(21) Appl. No.: 09/935,878

(22) Filed: Aug. 23, 2001

(65) Prior Publication Data

US 2003/0046515 A1  Mar. 6, 2003

(51) Int. Cl.
G06F 9/42 (2006.01)

(52) U.S. Cl. .................. 712/209; 712/227; 712/229; 712/234

(58) Field of Classification Search ................ 712/209, 712/227, 229, 233, 234
See application file for complete search history.

(56) References Cited

U.S. PATENT DOCUMENTS

| | | | |
|---|---|---|---|
| 5,781,750 A | 7/1998 | Bloomgren et al. |
| 5,826,089 A | 10/1998 | Ireton |
| 5,890,006 A | 3/1999 | Tran et al. |
| 5,961,632 A | 10/1999 | Shiell et al. |

OTHER PUBLICATIONS

Hennessy & Patterson, Computer Architecture A Quantative Approach, 1996, Morgan Kaufman Publishers, Second Edition pp. 221-223 (referenced as "Hennessy").*

* cited by examiner

Primary Examiner—Fritz Fleming
Assistant Examiner—Tonia L. Meonske
(74) Attorney, Agent, or Firm—Lerner, David, Littenberg, Krumholz & Mentlik, LLP

(57) ABSTRACT

A system and method for handling complex instructions includes generating a jump instruction from an address which may be embedded in a computer instruction and selecting the original instruction if it was not complex or the Jump instruction if it was.

8 Claims, 6 Drawing Sheets

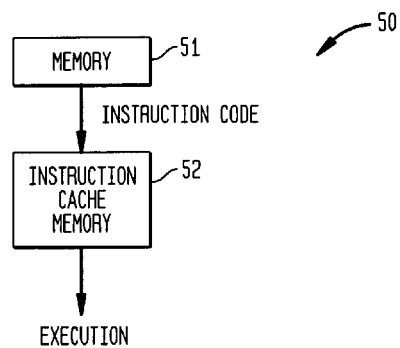
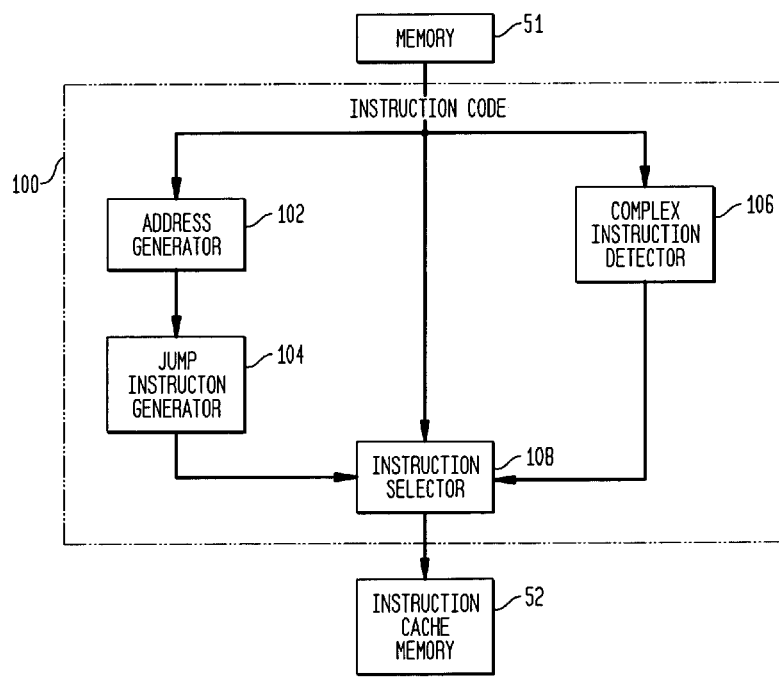

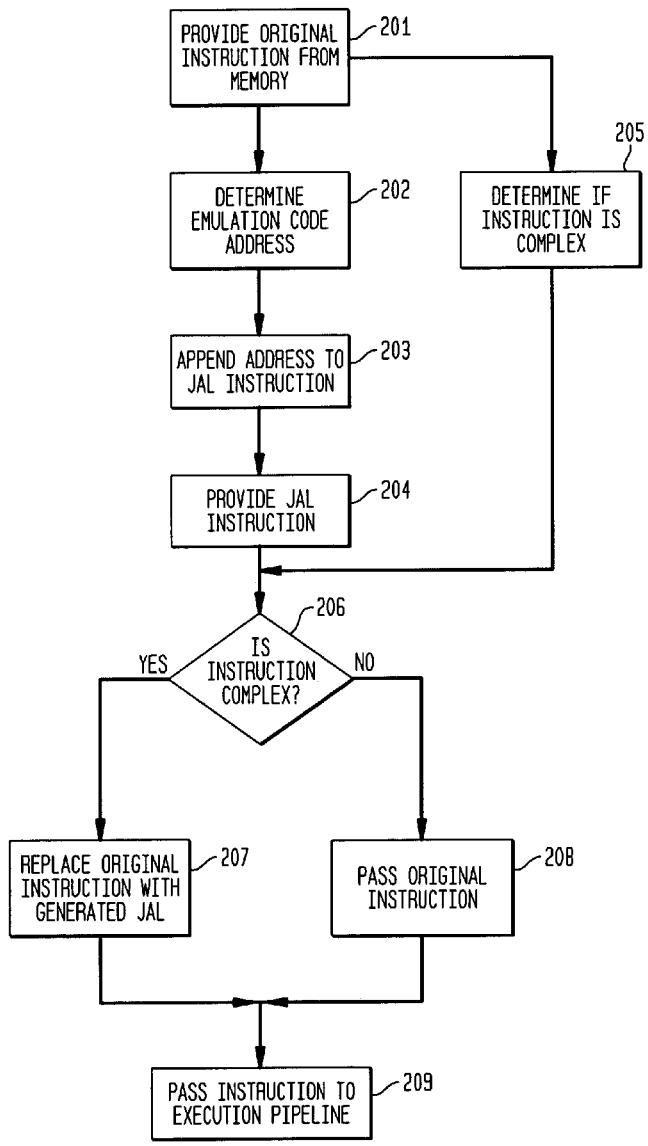

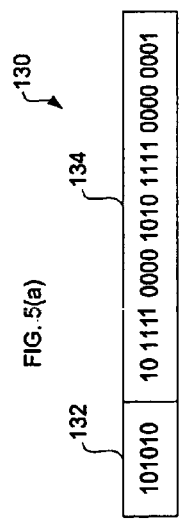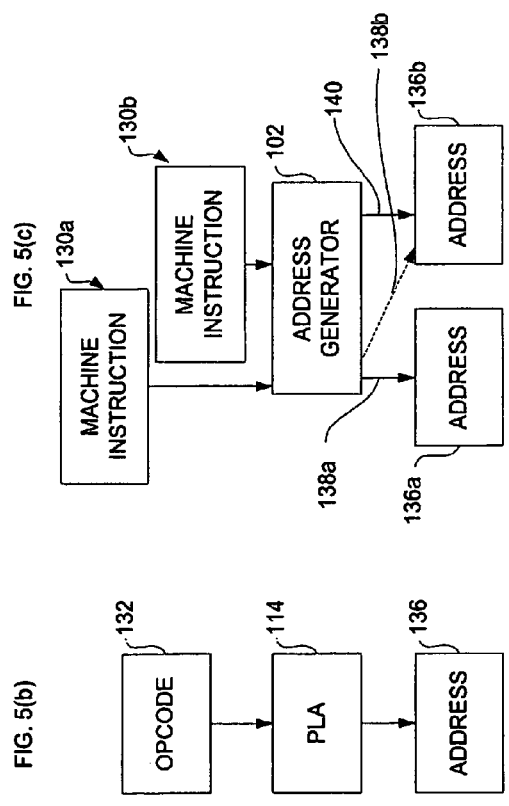

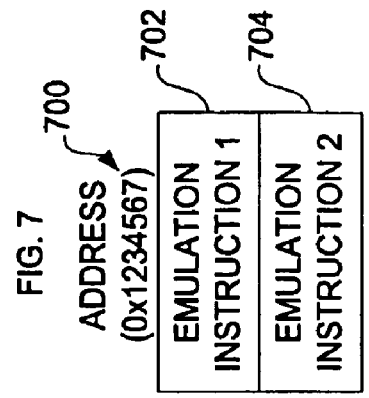
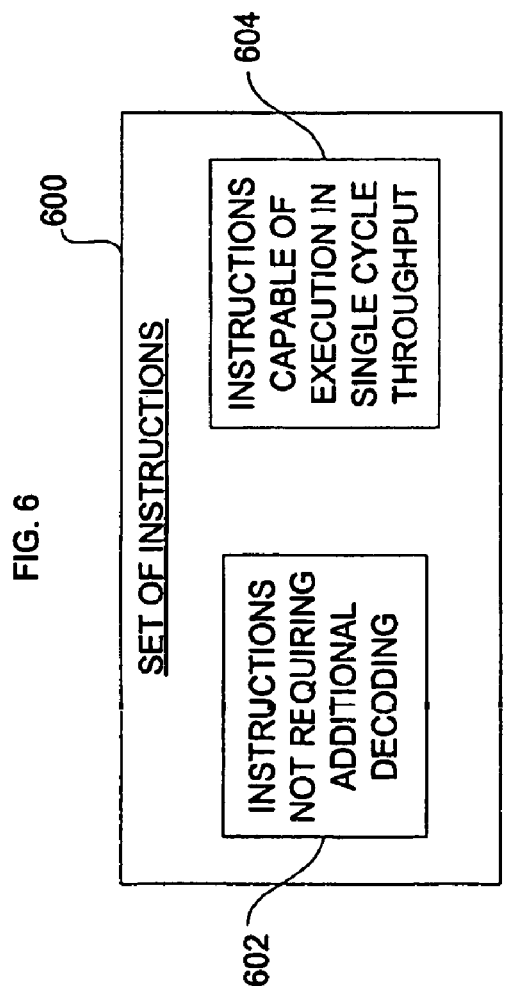

SYSTEM AND METHOD FOR PROCESSING COMPLEX COMPUTER INSTRUCTIONS

BACKGROUND OF THE INVENTION

Computers routinely perform complex tasks by breaking a single, complex task into a series of simpler instructions that the computer understands. These instructions are commonly referred to as "machine instructions," meaning that they are instructions which a computer processor chip can understand. In fact, even the simplest task for a human may involve a complex set of many different machine instructions. For example, a typical computer-processing chip will need to perform a number of different steps just to count from 2 to 10. A processor may: convert the number 2 into a binary-based value of one's and zero's and store the result in an area of memory known as a register; convert the number to increment by, i.e., the value of 1, to a binary-based value and store the result in another register; convert and store the value of 10 in yet another register; pass the binary values contained in the first two registers to circuits for adding two numbers together; store the sum back in the first register; check the new value in the first register against the value in the second register; and depending on the result of the comparison, repeat the process of adding and storing.

In fact, machine instructions may be broken down into even smaller machine instructions. For example, many chips are based on the CISC architecture (Complex Instruction Set Computer). In CISC, machine instructions can range from relatively simple to rather complex. During operation, each machine instruction is first converted into one or more "microinstructions" and the computer chip then executes the individual microinstructions. The conversion of machine instructions into microinstructions takes up processing time.

Accordingly, in order to increase processing speed, many computer chips now eliminate the conversion step. For example, as its name implies, RISC-based computer systems (Reduced Instruction Set Computer) tend to limit the machine instructions to a set of those instructions that can be immediately executed by the processor in a single time cycle throughput (A RISC processor needs multiple cycles to execute a instruction through a pipeline, but the throughput of the execution is one clock cycle). Thus, the delay in converting the machine instruction is avoided.

However, despite the limited and simplified instructions, many processor chips need to emulate more complex instructions. In some systems, when the chip sees a complex instruction which it cannot execute in a single step, it jumps to an area of the chip which breaks the complex instruction down into individual machine instructions. For example, programs are typically stored as a list of machine instructions, and each machine instruction is stored at its own unique address. The processor generally executes the instructions in sequence unless instructed to jump to a different address. So, when the processor encounters a complex instruction, it may implement a Jump and Link instruction to the area of the chip containing machine instructions that emulate the complex instruction. Specifically, the Jump and Link instruction causes the processor to store the address of the current instruction and then jump to a new address. The processor then executes the machine instruction at the new address. The processor continues executing those instructions until it encounters an instruction to return to the place of the jump. Upon returning, the processor picks up where it left off, i.e., the instruction at the address following the original Jump and Link instruction.

Complex instructions can be emulated using software or hardware. For example, some systems use no special hardware to implement complex instructions; their opcodes are treated as reserved instruction opcodes, which generate exception interrupts. In the interrupt procedure, the complex instruction opcode is examined to check if it is an illegal instruction code or to be emulated as a complex instruction. In other systems, the CPU has hardware to convert a complex instruction to multiple implemented simple instructions, such as microcodes. In these systems, the converting hardware may become quite complex.

There is a need for a system and method which is capable of quickly emulating complex instructions.

SUMMARY OF THE INVENTION

The present invention is directed towards those needs.

In one aspect, the invention provides a system and method for handling complex instructions including generating a jump and link instruction from an address which may be embedded in a computer instruction and selecting the jump instruction if the original instruction was complex or the original instruction if it was not.

Another aspect of the invention provides a system for processing a computer instruction from a source of such instructions. The system includes: a complex instruction detector having an input and an output, the input accepting computer instructions from the source and the output being indicative of whether the instruction is a member of set of instructions; an address generator having an input and an output, the input accepting computer instructions having a value and the output comprising an address based on the value; a jump instruction generator having an input and an output, the input being in communication with the address generator output and the output comprising an instruction to jump to the address from the address generator; and an instruction selector having inputs and an output, the inputs being in communication with the jump instruction generator, the source and the complex instruction detector, the output comprising the instruction from the source or the instruction from the jump instruction generator depending upon the output of the complex instruction detector.

Yet another aspect provides a method of processing a computer instruction. The method includes generating an address from the value associated with the computer instruction; generating a jump instruction based on said address; determining whether the computer instruction is complex; and selecting the jump instruction or the computer instruction.

BRIEF DESCRIPTION OF THE DRAWINGS

FIG. 1 is a schematic diagram of portions of a prior art system.

FIG. 2 is a schematic diagram of one aspect of the invention.

FIG. 3 is a flow chart of one aspect of the invention.

FIGS. 5(a)–(c) illustrate a machine instruction and opcode processing in accordance with one aspect of the present invention.

FIG. 6 illustrates a set of instruction in accordance with one aspect of the present invention.

FIG. 7 illustrates addressing and instructions in accordance with one aspect of the present invention.

DETAILED DESCRIPTION OF THE EMBODIMENTS

A prior art processing system is shown in FIG. 1. Although the invention is not limited to use in such a system, it shall be used as an example for the purpose of illustration only. Memory 51 is a source of machine instructions which are to be executed by the processor. Memory 51 may be physically located any number of different places, such as by way of example only an L1 cache which is built into the chip containing the processor's circuits, an L2 cache which is located externally to the chip, or some other storage device or medium. The machine instructions (also, "instruction code") are received from memory 51 and placed in instruction code cache 52. Because it takes time to get instructions from memory 51, the instruction code cache is used to hold a certain number of instructions so they can be quickly accessed and executed by the processor.

Figure 4:
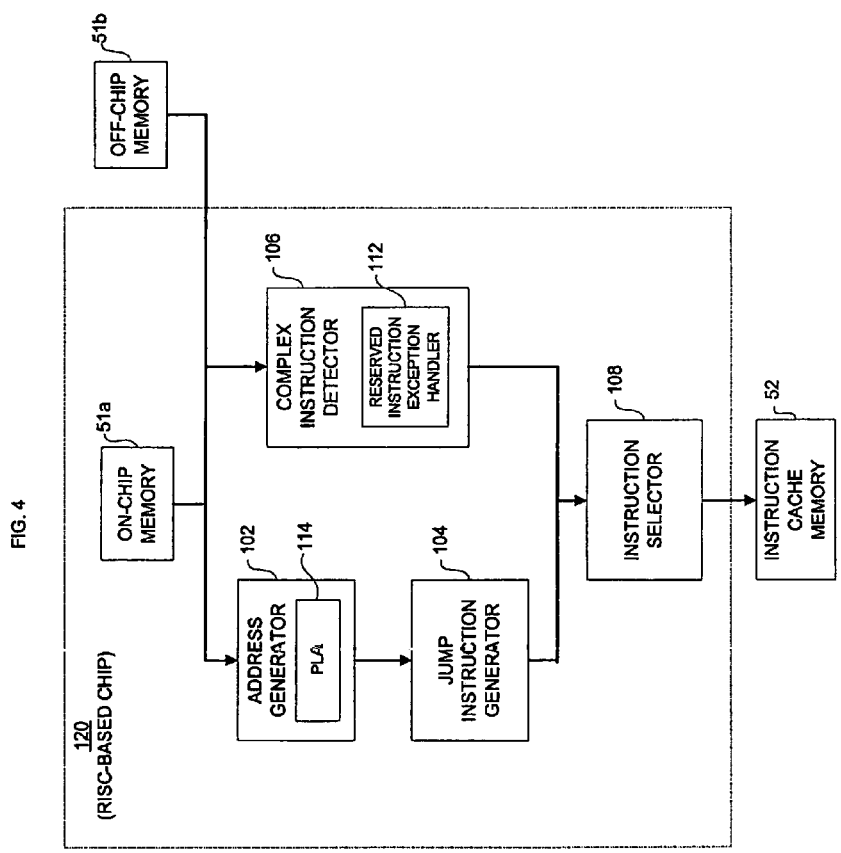
FIG. 4 is a schematic diagram of one aspect of the present invention.

A system 100 in accordance with the present invention is shown in FIG. 2. Rather than passing the instruction code directly from memory 51 into the instruction cache memory 52, the instruction code is passed through system 100. System 100 includes an address generator 102, jump instruction generator 104, complex instruction detector 106 and instruction selector 108, all of which are in direct or indirect communication with one another. The address generator 102, the jump instruction generator 104, the complex instruction detector 106 and the instruction selector 108 may be located on a single computer chip 120 (e.g., a RISC-based chip), as seen in FIG. 4. The memory 51 may be an on-chip memory 51a or an off-chip memory 51b.

One of the functions performed by the Complex Instruction Detector 106 is determining whether an instruction is complex. Complex instruction detector 106 accepts the instruction codes from memory 51 as input and determines whether the instruction is complex, i.e., whether it is a member of the set of instructions which the processor can execute. In other words, it determines whether the instruction can be executed by the CPU hardware directly instead of needing to be implemented by executing multiple instructions. The output of the complex instruction detector is preferably, but not necessarily, a single bit which indicates whether the instruction is or is not complex. As seen in FIG. 6, the set of instructions 600 may include a subset 602 that includes instructions which are capable of being executed by the processor without additional decoding. The set of instructions 600 may also include a subset 604 that includes instructions which are capable of being executed by the processor in a single cycle throughput.

As seen in FIG. 5(a), machine instructions 130 typically have two components: the operation code (also, "opcode") 132 and the operand 134. These two components are then combined to form a single digital value. The operation code 132 basically tells the computer the operation to be performed, such as jumping to an address, adding two numbers or storing a value. Each operation code corresponds with a different binary value. For example, the Jump and Link opcode 132 may be represented by the value "0000 11" whereas the storing function may be represented by the value "1010 00". The operand 132 contains the data to be used by the operation. For example, the operand 134 may represent a target address having the value "10 1111 0000 1010 1111 0000 0001." Thus, a Jump and Link instruction to that address would be represented by a combination of the opcode and the operand values, e.g., "0000 1110 1111 0000 1010 1111 0000 0001."

In one aspect of the present invention, the complex instructions detector 106 uses the reserved instruction exception to determine whether the opcode represents a complex instruction. In typical CPU's, the reserved instruction exception is used to prevent execution of unimplemented or illegal instructions on the CPU hardware. The exception usually occurs when the processor executes data as instructions accidentally. Accordingly, complex instruction detector 106 may, but not necessarily, use the logic associated with generating reserved instruction exceptions to generate a signal indicative of complexity. For example, as seen in FIG. 4, the complex instruction detector may include a reserved instruction exception handler 112.

If the instruction is complex, then the present invention replaces the complex instruction with a jump and link instruction to an area of the chip (as seen in FIG. 4, e.g., memory 51a if the memory is contained on the chip or memory 51b if the memory is not contained on the chip) that emulates the complex instruction with individual machine instructions.

One of the purposes of address generator 102 is to determine where the emulation code resides for particular complex instructions. The address generator 102 accepts instruction codes from memory 51 as input. Address generator 102 then determines the address of the emulation code if the instruction is complex. The output is supplied to jump instruction generator 104.

The address generator is not limited to any particular manner of translating opcodes into memory addresses. For example, it may include a Programmable Logic Array (PLA) 114 whereby the input comprises an opcode and the output equals the address. For example, as seen in FIG. 5(b), the PLA 114 may specify that a complex instruction opcode 132 of 101010 always jump to emulation code at an address 136, for instance address 0x1234567 or the like. For instance, as seen in FIG. 7, address 700 may point to other instructions 702 and 704 which are capable of execution by the processor and which emulate the computer instruction. A different complex instruction may jump to code at a different address. These addresses may be anywhere in the memory space, on or off of the chip. If the emulation code is stored on a chip, it may be quickly accessed but the size becomes more limited and not necessarily re-programmable. If the emulation code is stored in a main memory, it may be relatively slower but also more flexible.

Jump instruction generator 104 generates a jump instruction using the address generated by address generator 102. For example, regardless of whether the original instruction was complex or not, it appends the opcode for Jump and Link to the address from address generator 102.

Instruction selector 108 selects either the instruction as unmodified from memory 51 or the Jump and Link instruction created by jump instruction generator 104. The instruction selector makes this choice based on the output value of complex instruction detector 106. By way of example, if the output value of the complex instruction detector 106 is 1, then instruction selector 108 will output the instruction received from jump instruction generator 104 to instruction cache memory 52. Otherwise, if the output value of the complex instruction detector is 0, then instruction selector 108 will output the instruction received from memory 51 to instruction cache memory 52; in other words, it is passed unmodified to the instruction cache memory 52. Preferably, if the instruction is not complex but rather, illegal, the output of the instruction selector 108 will indicate that the instruction is not complex. Accordingly, rather than being emulated, illegal instructions will get passed into the execution pipeline and cause an exception.

For purposes of illustration, an exemplary operation may include the following steps. Memory 51 is assumed to contain the following three machine instructions:

Inst#0

DMULTU rs, rt

Inst#2 where "Inst#0" and "Inst#2" represent any instruction and "DMULTU rs, rt" represents an instruction to multiply 64-bit sized operand values stored in registers rs and rt to obtain a 128-bit sized result. (The DMULTU function is supported by the MIPS 64 5K™ Processor as described in the MIPS 64 5K™ Processor Core Family Software User's Manual, dated 2001). Rather than incurring the expense of providing large-value multiplier hardware with the processor, a processor in accordance with the present invention is able to emulate the DMULTU instruction, without changing the original instructions, by using a standard, less expensive 32-bit multiplier.

Figure 3A:
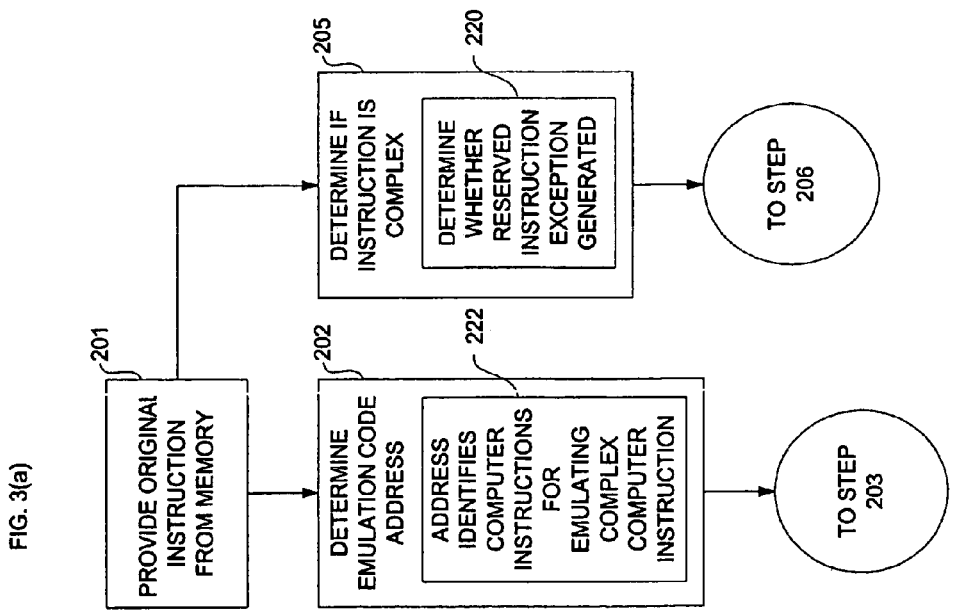
FIG. 3(a) is a flow chart of one aspect of the invention.

When the DMULTU instruction is transferred from memory 51 into instruction cache 52, it is first passed into the system 100 (FIG. 3, step 201). For purposes of illustration, it shall be assumed that all opcodes of the system are 6 bits long and that DMULTU is represented by the binary value "011101".

The instruction is simultaneously passed to the address generator 102, one of the inputs to the instruction selector 108 and the complex instruction detector 106.

Address generator 102 then determines the address for the instruction based on the opcode (and potentially some or all of the operand) for the instruction word "DMULTU" (step 202). The address may identify computer instructions for emulating the complex computer instruction (FIG. 3(*a*), substep 222).

Accordingly, an address having a value hereafter designated as emu_DMULTU will be determined and passed to jump instruction generator 104 (step 202). Jump instruction generator 104 then appends the opcode value for Jump and Link to the address from the address generator 102 to create the instruction "JAL emu_DMULTU" (step 203). The JAL instruction is then provided to the instruction selector 108 (step 204).

The original instruction "DMULTU rs, rt" is also passed to the complex instruction detector 106. Detector 106 tests the instruction to see whether it is complex or not (step 205). As seen in FIG. 3(*a*), step 205 may include determining whether the computer instruction generates a reserved instruction exception (substep 220). It shall be assumed that DMULTU would test positive as a complex instruction and, accordingly, a bit value of 1 is provided by detector 106 to instruction selector 108.

Upon receipt of the various inputs, instruction selector 108 selects the instruction directly from memory if the bit value of the detector 106 is 0 (step 208) and selects the instruction from generator 104 if the bit value of the detector 106 is 1 (step 206). Using the foregoing example, the bit value is 1, so the instruction "JAL emu_DMULTU" would be sent to the instruction cache instead of "DMULTU rs, rt" (step 207, 209). This will cause the processor to jump and link to the code at address emu_DMULTU, which uses the following code for a 64-bit multiplier to emulate the code for a 128-bit multiplier. It makes 64-bit partial products and adds them to get a 128 bit product. The operation is HI(63:0)|LO(63:0)<_rs(63:0)*rt(63:0):

```
Emu_DMULTU:
MULTU    rs, rt          ; HI | LO <- rs(31:0)*rt(31:0)
MOV      tls, rs         ; tls <- rs
MOV      tlt, rt         ; tlt <- rt
DSRL32   ths, rs, 0      ; ths(31:0) <-rs(63:32)
DSRL32   tht, rt, 0      ; tht(31:0) <-rt(63:32)
MFLO     x1              ; x1 <- LO
MFHI     xh              ; x2 <- HI
DSLL32   xh, xh, 0       ; xh(63:32) <- xh(31:0)
OR       x1, xh, xl      ; x1 <- result of rs(31:0)*rt(31:0)
MULTU    ths, rt         ; HI | LO <- rs(63:32)*rt(31:0)
MFLO     x1              ; x1 <- LO
MFHI     xh              ; x2 <- HI
DSLL32   xh, xh, 0       ; xh(63:32) <- xh(31:0)
OR       x2, xh, xl      ; x2 <- result of rs(63:32)*rt(31:0)
MULTU    rs, tht         ; HI | LO <- rs(31:0)*rt(63:32)
MFLO     x1              ; x1 <- LO
MFHI     xh              ; x2 <- HI
DSLL32   xh, xh, 0       ; xh(63:32) <- xh(31:0)
OR       x3, xh, xl      ; x3 <- result of rs(31:0)*rt(63:32)
MULTU    ths, tht        ; HI | LO <- rs(63:32)*rt(63:32)
MFLO     x1              ; x1 <- LO
MFHI     xh              ; x2 <- HI
DSLL32   xh, xh, 0       ; xh(63:32) <- xh(3l:0)
OR       x4, xh, xl      ; x4 <- result of rs(63:32)*rt(63:32)
ADD      xm, x2, x3      ; xm <-x2 + x3
DSLL32   xmx, xm, 0      ; xmx(63:32) <- xm(31:0)
ADD      x1, xmx, x1     ; x1 <-xmx + x1
MTLO     x1              ; LO <- x1
ADD      x4, xmx, x4     ; x4 <- xmx = x4
MTHI     x4              ; JO <- x4
JR       r31             ; Link Return
```

Accordingly, the foregoing example illustrates how the complex instruction DMULTU may be quickly emulated by other instructions.

The present invention provides a number of advantages. It allows complex instructions to be emulated by jumping to simpler sets of instructions in a quick manner without complex decoding. Rather than waiting to see if an instruction is complex or not, the address is extracted and a Jump instruction is created. The instruction is also simultaneously tested for complexity. If it is complex, the Jump Instruction to the emulation code is ready and waiting. If it is not, no time is lost because the instruction would have been tested for complexity anyway.

The invention is also advantageous in that it permits different implementations which can vary with the needs of the application. For example, address generator 102 may use more than just the opcode to determine the address of the emulated code. For some or all of the opcodes, it may use the operands as well, such that the same complex instruction may jump to different addresses and different emulation code depending on the arguments used by the instruction. For example, as seen in FIG. 5(*c*), the address generator 102 may process machine instructions 130*a* and 130 *b* and may jump the two instructions to different addresses 136*a* and 136*b*, as seen by lines 138*a* and 140, respectively. Alternatively, the address generator 102 may jump all complex instructions to the same address, thus leaving it up to the emulation code to decode the complex instruction and determine the details of the opcode and operands (if any). As shown in FIG. 5(*c*), the address generator 102 may process the machine instructions 130*a* and 130*b* and may jump them to the same address, address 136*b*, as seen by dashed line 138*b* and line 140, respectively. Accordingly, one or the other or a combination of both methods can be used to fit the needs of the chip and the chip's application. If there are a limited number of complex instructions, then each instruction may go to a unique address. If there are large number of complex instructions, then nearly all or all of complex instructions may be jumped to the same address.

For example, in connection with the DMULTU instruction above, it is preferable for the address generator 102 to decode some or all operands and generate an address according to the operands. This will ensure that the JAL instruction jumps to emulation code which is capable of determining the source and destination registers defined by the operands. More specifically, some of the upper bits of the output address may be generated according to the opcode, and lower bits may be generated based on the operands. Alternatively, the instruction could be completely decoded by software after the address generator 102 generates an address (such as by subtracting four from the link register).

Another advantage of the invention arises out of using the reserved instruction exception in connection with the complex instruction detector 106. This allows the complex instruction detector 106 to actually perform two functions: determining whether the instruction is actually illegal code or, instead, a complex code. If it is a complex code, then it is emulated. Otherwise, it is treated as a real error. The reserved instruction exception can also be implemented in the address generator 102 by checking opcodes not only for complexity, but also for validity.

Moreover, all or part of the decoding of complex instructions is done by hardware without degrading the performance of the instruction execution pipeline because the instruction can decoded and replaced with a Jump and Link instruction between the memory system and a cache outside of the execution pipeline. In the case of using a reserved instruction exception, the instruction is decoded by software only. Even so, because the invention replaces a complex instruction to a Jump and Link instruction, the hardware implementation is relatively simple and it does not require changes to the execution pipeline.

Unless stated to the contrary, any use of the words such as "including," "containing," "comprising" and the like, means "including without limitation" and shall not be construed to limit any general statement that it follows to the specific or similar items or matters immediately following it. References to a "plurality" of things means at least two of the things, and, unless stated to the contrary, reference to "a" or "one" thing does exclude the possibility of using a plurality of such things.

Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims.

The invention claimed is:

1. A method of executing a program with a processor, the processor being capable of executing a set of instructions, comprising:
   providing an original instruction from a sequence of instructions comprising a program stored in a memory;
   generating an address from the original instruction;
   generating a jump and link instruction to the address, the jump and link instruction comprising an instruction for the processor to execute instructions at the address and then return to the instruction following the original instruction in the program;
   determining whether the original instruction is a member of the set of instructions;
   selecting the jump and link instruction or the original instruction based on the result of the step of determining; and
   providing the selected instruction to the processor;
   wherein the step of determining whether the original instruction is a member of the set of instructions is performed in parallel with generating the address and generating the jump and link instruction.

2. The method of claim 1 further including providing the selected instruction to an instruction cache of the processor.

3. The method of claim 2 wherein the step of providing an original instruction includes retrieving the instruction from a memory.

4. A system for processing computer instructions comprising:
   a source of complex and simple instructions, the simple instructions being capable of being executed by the processor and the complex instructions not being capable of being executed by the processor,
   a complex instruction detector connected to the source and an instruction selector, the complex instruction detector receiving computer instructions from the source and providing a value indicative of whether a received instruction is complex or simple,
   an address generator connected to the source and a jump instruction generator, the address generator receiving computer instructions from the source and, if a received instruction is complex, providing an address in a memory containing emulation instructions to the jump instruction generator, whereby the emulation instructions are simple instructions and emulate the intended function of the complex instruction,
   the jump instruction generator being connected to the address generator and the instruction selector, the jump instruction generator receiving addresses from the address generator and providing jump and link instructions to the addresses,
   the instruction selector being connected to the jump instruction generator and the complex instruction detector such that the instruction selector provides a jump and link instruction from the jump instruction generator if the instruction received from the source is complex, or provides the instruction if the instruction received from the source is simple, and
   a processor for receiving the instructions from the instruction selector;
   wherein the complex instruction detector is configured to operate on the received instruction in parallel with the address generator and the jump instruction generator operating on the received instruction.

5. The system of claim 4 further comprising an instruction cache disposed between the instruction selector and the processor.

6. The system of claim 4 wherein the address generator provides a first address in response to a first complex instruction and a second address in response to a second instruction, the first and second addresses being different.

7. The system of claim 4 wherein the complex instruction detector uses routines associated with reserved instruction exceptions.

8. A system for processing a computer instruction from a source of such instructions, the system comprising:
   a complex instruction detector being operable to accept computer instructions from the source and to determine whether each instruction is a complex instruction on an instruction by instruction basis;

an address generator being operable to accept computer instructions from the source and to output an address for each of the computer instructions based on the respective computer instruction;

a jump instruction generator in operative communication with the address generator, the jump instruction generator being operable to receive information from the address generator and to output an instruction to jump to the address output from the address generator based upon the information; and an instruction selector in operative communication with the jump instruction generator, the source, and the complex instruction detector, the instruction selector being operable to output either the computer instruction from the source or the instruction from the jump instruction generator depending upon the determination by the complex instruction detector;

wherein the complex instruction detector is configured to operate on the computer instructions in parallel with the address generator operating on the computer instructions and the jump instruction generator operating on the information received from the address generator.

* * * * *